United States Patent
Khatri et al.

(10) Patent No.: US 9,139,476 B2
(45) Date of Patent: Sep. 22, 2015

(54) COMPOSITIONS AND METHODS FOR WELL COMPLETIONS

(75) Inventors: Deepak Khatri, Houston, TX (US); Cecilia Nguyen, Houston, TX (US); Syed Ali, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 773 days.

(21) Appl. No.: 12/938,429

(22) Filed: Nov. 3, 2010

(65) Prior Publication Data

US 2012/0103609 A1    May 3, 2012

(51) Int. Cl.
| C09K 8/467 | (2006.01) |
| C04B 28/04 | (2006.01) |
| C04B 24/14 | (2006.01) |
| C09K 8/46  | (2006.01) |
| C04B 103/20| (2006.01) |

(52) U.S. Cl.
CPC ............ *C04B 28/04* (2013.01); *C04B 24/14* (2013.01); *C09K 8/46* (2013.01); *C09K 8/467* (2013.01); *C04B 2103/20* (2013.01)

(58) Field of Classification Search
None
See application file for complete search history.

(56) References Cited

U.S. PATENT DOCUMENTS

| 3,131,075  | A  * | 4/1964  | Brooks, Jr. ............... 106/726 |
| 6,182,758  | B1   | 2/2001  | Vijn |
| 6,591,909  | B1 * | 7/2003  | Dao et al. ................ 166/293 |
| 6,800,128  | B2   | 10/2004 | Dao et al. |
| 7,240,732  | B2   | 7/2007  | Lewis et al. |
| 7,799,741  | B2 * | 9/2010  | Guzmann et al. .......... 507/129 |
| 2004/0238170 | A1 * | 12/2004 | Fanguy et al. ............ 166/291 |
| 2009/0297884 | A1 * | 12/2009 | Becker et al. ............ 428/689 |
| 2010/0267096 | A1 * | 10/2010 | Baus et al. ............... 435/129 |

OTHER PUBLICATIONS

Nelson EB, Michaux M and Drochon B: "Cement Additives and Mechanisms of Action," in Nelson EB and Guillot D. (eds.): Well Cementing (2nd Edition), Schlumberger, Houston (2006) 49-91.
Biotechnology at BASF, brochure accessed on Oct. 30, 2009: http://www.basf.com/group/corporate/en/function/conversions:/publish/content/products-and-industries/biotechnology/images/Biotechnology_at_BASF.pdf.
Wohlleben W et al.: "Recombinantly Produced Hydrophobins from Fungal Analogues as Highly Surface-Active Performance Proteins," Eur Biophys J., 39 (3) Feb 2010: 457-468.

* cited by examiner

*Primary Examiner* — Angela M DiTrani
(74) *Attorney, Agent, or Firm* — Jeremy D. Tillman; Rachel E. Greene; Tim Curington

(57) ABSTRACT

Cement retarders for well cements are based on hydrophobins. Hydrophobins are proteins or polypeptides that form hydrophobic coatings on surfaces. The size of the hydrophobins is preferably between about 100 and 350 amino acids, and the preferred hydrophobin concentration is between about 0.001% and 1.0% by weight of cement. Portland cement is the preferred well cement. Cement slurries containing hydrophobins are useful for both primary and remedial cementing applications.

16 Claims, 1 Drawing Sheet

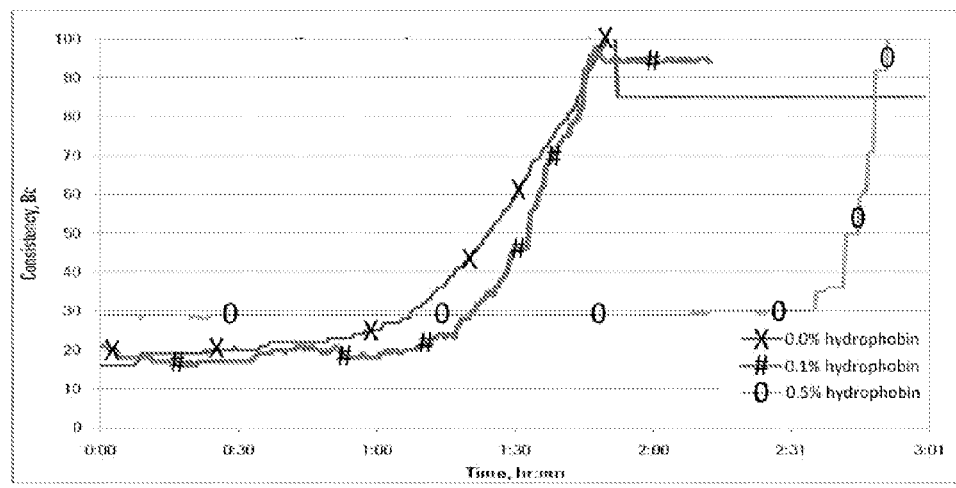

COMPOSITIONS AND METHODS FOR WELL COMPLETIONS

BACKGROUND OF THE INVENTION

The statements in this section merely provide background information related to the present disclosure and may not constitute prior art.

Embodiments relate to compositions and methods for treating subterranean formations, in particular, compositions and methods for cementing subterranean wells.

During the construction of subterranean wells, it is common, during and after drilling, to place a tubular body in the wellbore. The tubular body may comprise drillpipe, casing, liner, coiled tubing or combinations thereof. The purpose of the tubular body is to act as a conduit through which desirable fluids from the well may travel and be collected. The tubular body is normally secured in the well by a cement sheath. The cement sheath provides mechanical support and hydraulic isolation between the zones or layers that the well penetrates. The latter function is important because it prevents hydraulic communication between zones that may result in contamination. For example, the cement sheath blocks fluids from oil or gas zones from entering the water table and polluting drinking water. In addition, to optimize a well's production efficiency, it may be desirable to isolate, for example, a gas-producing zone from an oil-producing zone. The cement sheath achieves hydraulic isolation because of its low permeability. In addition, intimate bonding between the cement sheath and both the tubular body and borehole is necessary to prevent leaks.

Optimal cement-sheath placement often requires that the cement slurry contain a retarder. Cement retarders delay the setting of the cement slurry for a period sufficient to allow slurry mixing and slurry placement in the annular region between the casing and the borehole wall, or between the casing and another casing string.

A wide range of chemical compounds may be employed as cement retarders. The most common classes include ligno-sulfonates, cellulose derivatives, hydroxycarboxylic acids, saccharide compounds, organophosphonates and certain inorganic compounds such as sodium chloride (in high concentrations) and zinc oxide. A more complete discussion of retarders for well cements may be found in the following publication—Nelson E B, Michaux M and Drochon B: "Cement Additives and Mechanisms of Action," in Nelson E B and Guillot D. (eds.): *Well Cementing (2nd Edition)*, Schlumberger, Houston (2006) 49-91.

Certain types of retarders have been blended with other compounds to extend their useful temperature range, improve cement-slurry properties, or both. For example, the useful temperature range of certain lignosulfonate retarders may be extended to more than 260° C. by adding sodium tetraborate decahydrate (borax). Sodium gluconate may be blended with a lignosulfonate and tartaric acid to improve the rheological properties of the cement slurry. Thus, a myriad of retarders and retarder blends exist which may be applicable to a wide range of subterranean-well conditions.

Cement-retarder technology for well cements is sophisticated; however, as exploration and production operations continue to move into environmentally sensitive areas, especially offshore locations, the population of retarders that may be used is increasingly limited. Government regulations frequently require well operators to restrict themselves to chemical products that have low toxicity and do not bioaccumulate.

It thus becomes more and more challenging to develop efficient cement retarders (and other types of additives) that can meet these ecological criteria. Despite the valuable contributions of the prior art, there remains a need for cement retarders that conform to environmental regulations.

SUMMARY OF THE INVENTION

Embodiments allow improvements by providing biodegradable, low-toxicity retarders.

In an aspect, embodiments relate to well-cementing compositions.

In a further aspect, embodiments relate to methods for retarding a cement slurry.

In yet a further aspect, embodiments relate to methods for cementing a subterranean well.

BRIEF DESCRIPTION OF THE DRAWINGS

FIG. 1 shows a series of thickening-time charts that illustrates the performance of the inventive cement retarder.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

As stated earlier, there is a need for cement retarders that are biodegradable and do not bioaccumulate. Surprisingly, the inventors discovered that hydrophobins satisfy, at least in part, the goals described above.

The term "hydrophobin" shall hereinafter refer to a protein or polypeptide of the general structural formula shown below.

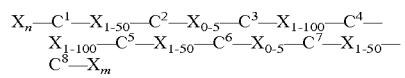

where X may be any of the 20 naturally occurring amino acids (Phe, Leu, Ser, Tyr, Cys, Tip, Pro, His, Glm, Arg, Ile, Met, Thr, Asn, Lys, Val, Ala, Asp, Glu and Gly). Each X may be the same or different. The indices next to X indicate in each case the number of amino acids, C represents cysteine, alanine, serine, glycine, methionine or threonine subject to the proviso that at least four of the amino acids identified by C are cysteine, and the indices n and m are independently natural numbers in the range of 0 to 500 and preferably in the range from 5 to 350 and preferably in the range from 15 to 300.

Hydrophobins occur naturally on filamentous fungi, but may also be synthesized artificially. They have a marked affinity for interfaces and are therefore may be useful for coating surfaces. The coating may usually be hydrophobic. Without wishing to be bound by any theory, it is thought that hydrophobins form a hydrophobic coating on cement particles, thereby inhibiting contact between water and the cement-particle surfaces, and resulting in a retarding effect.

In an aspect, embodiments relate to well-cementing compositions that comprise an inorganic cement, water and a retarder comprising at least one hydrophobin protein. The composition may be pumpable. Those skilled in the art will recognize that a pumpable cement slurry usually has a viscosity lower than 1000 mPa-s at a shear rate of $100\ s^{-1}$.

In a further aspect, embodiments relate to methods for retarding an inorganic cement slurry. Water is added to a hydraulic cement, thereby producing a slurry. At least one hydrophobin compound is added to the slurry. The slurry may be pumpable. Those skilled in the art will recognize that a pumpable cement slurry usually has a viscosity lower than 1000 mPa-s at a shear rate of $100\ s^{-1}$.

In yet a further aspect, embodiments relate to methods for cementing a subterranean well. An inorganic cement is provided, to which water is added to form a slurry. At least one hydrophobin compound is added to the slurry, and the slurry is placed into the well. The slurry may be pumpable. Those skilled in the art will recognize that a pumpable cement slurry usually has a viscosity lower than 1000 mPa-s at a shear rate of $100\ s^{-1}$. Those skilled in the art will recognize that embodiments of the methods may relate to either primary or remedial cementing. In addition, those skilled in the art will recognize that the composition may be pumped through various tubulars including (but not limited to) drillpipe, casing and coiled tubing. The cementing procedure may be the traditional one during which the cement composition is pumped downward through tubulars, and upward inside the annulus between the tubulars and the borehole wall, or between the tubulars and another tubular string. Or, the "reverse-cementing" procedure may be employed, during which the cement composition is pumped downward through the annulus.

In embodiments, the size of the hydrophobin is preferably between about 100 and 350 amino acids, and more preferably between about 100 to 150 amino acids. The hydrophobin concentration in the cement slurry is preferably between about 0.001% and 1.0% by weight of cement, more preferably between about 0.05% and 1.0% by weight of cement, and most preferably between about 0.1% and 0.5% by weight of cement.

The inorganic cement may comprise one or more members of the list comprising Portland cement, calcium aluminate cement, fly ash, blast-furnace slag, lime-silica blends, geopolymers, Sorel cements, chemically bonded phosphate ceramics, zeolites and cement-kiln dust. Of these, Portland cement is preferred.

The cement compositions may further comprise more additives such as (but not limited to) extenders, fluid-loss additives, lost-circulation additives, additives for improving set-cement flexibility, self-healing additives, gas-generating agents, antifoam agents, dispersants and anti-settling agents.

EXAMPLES

The following example serves to further illustrate the invention.

Example 1

Three Portland-cement slurries were prepared with the following base-slurry composition: Class H cement, 0.2% polypropylene glycol antifoam agent by weight of cement, and 38.8% water by weight of cement (BWOC). The slurry density was 1970 $kg/m^3$ (16.4 lbm/gal). Hydrophobin retarder was added at the following concentrations: 0%, 0.1% and 0.5% by weight of cement. The hydrophobin was as disclosed in Wohlleben W et al.: "Recombinantly Produced Hydrophobins from Fungal Analogues as Highly Surface-Active Performance Proteins," Eur Biophys J., 39 (3) February 2010: 457-468.

Thickening time tests were performed in a pressurized consistometer at 52° C. (125° F.) and 35.6 MPa (5160 psi), according to the standard procedure described in ISO Publication 10426-2. The results, presented in Table 1 and FIG. 1, show that hydrophobin is an effective cement retarder. Furthermore, the fast viscosity transition from 30 Bc to 100 Bc, sometimes referred to as a "right-angle set," is a desirable feature. The abbreviation "Bc" refers to "Bearden units"—a common viscosity unit, also known as "consistency," employed in the well-service industry. The time at which the slurry viscosity attains 100 Bc is referred to as the slurry's "thickening time."

TABLE 1

Thickening-Times of Cement Slurries Containing a Hydrophobin Retarder

| | Time (hr:min) | | |
|---|---|---|---|
| Consistency | 0% hydrophobin (BWOC) | 0.1% hydrophobin (BWOC) | 0.5% hydrophobin (BWOC) |
| 30 Bc | 1:08 | 1:21 | 2:09 |
| 70 Bc | 1:36 | 1:39 | 2:47 |
| 100 Bc | 1:50 | 1:49 | 2:52 |

The invention claimed is:

1. A pumpable well-cementing composition, comprising an inorganic cement, water and a retarder, wherein said retarder comprises at least one hydrophobin;
   wherein the hydrophobin concentration is between 0.001% and 1.0% by weight of cement.

2. The composition of claim 1, wherein the composition has a viscosity lower than 1000 mPa-s at a shear rate of 100 $s^{-1}$.

3. The composition of claim 1, wherein the hydrophobin size is between about 100 and 350 amino acids.

4. The composition of claim 1, wherein the inorganic cement comprises one or more members of the list comprising Portland cement, calcium aluminate cement, lime-silica blends, geopolymers, Sorel cements, chemically bonded phosphate ceramics, zeolites and cement-kiln dust.

5. A method for retarding a cement slurry, comprising
   (i) providing an inorganic cement and adding water, thereby producing a slurry; and
   (ii) adding at least one hydrophobin to the slurry to retard the slurry;
   wherein the hydrophobin concentration is between 0.001% and 1.0% by weight of cement.

6. The method of claim 5, wherein the slurry is pumpable.

7. The method of claim 5 wherein the slurry has a viscosity lower than 1000 mPa-s at a shear rate of $100\ s^{-1}$.

8. The method of claim 5, wherein the hydrophobin size is between about 100 and 350 amino acids.

9. The method of claim 5, wherein the inorganic cement comprises one or more members of the list comprising Portland cement, calcium aluminate cement, lime-silica blends, geopolymers, Sorel cements, chemically bonded phosphate ceramics, zeolites and cement-kiln dust.

10. A method for cementing a subterranean well, comprising:
   (i) providing an inorganic cement and adding water, thereby producing a slurry;
   (ii) adding at least one hydrophobin to the slurry to retard the slurry; and
   (iii) placing the slurry into the subterranean well;
   wherein the hydrophobin concentration is between about 0.001% and about 1.0% by weight of cement.

11. The method of claim 10, wherein the slurry is pumpable.

12. The method of claim 10, wherein the slurry has a viscosity lower than 1000 mPa-s at a shear rate of $100\ s^{-1}$.

13. The method of claim 10, wherein the hydrophobin size is between about 100 and 350 amino acids.

14. The method of claim 13, wherein the hydrophobin size is between about 100 and 150 amino acids.

15. The method of claim 10, wherein the inorganic cement comprises one or more members of the list comprising Portland cement, calcium aluminate cement, fly ash, blast-furnace slag, lime-silica blends, geopolymers, Sorel cements, chemically bonded phosphate ceramics, zeolites and cement-kiln dust.

16. The method of claim 10, wherein the cementing operation is a primary cementing one.

\* \* \* \* \*